July 21, 1959 T. W. HELM 2,895,314
UNIVERSAL JOINT
Filed July 25, 1958 2 Sheets-Sheet 1
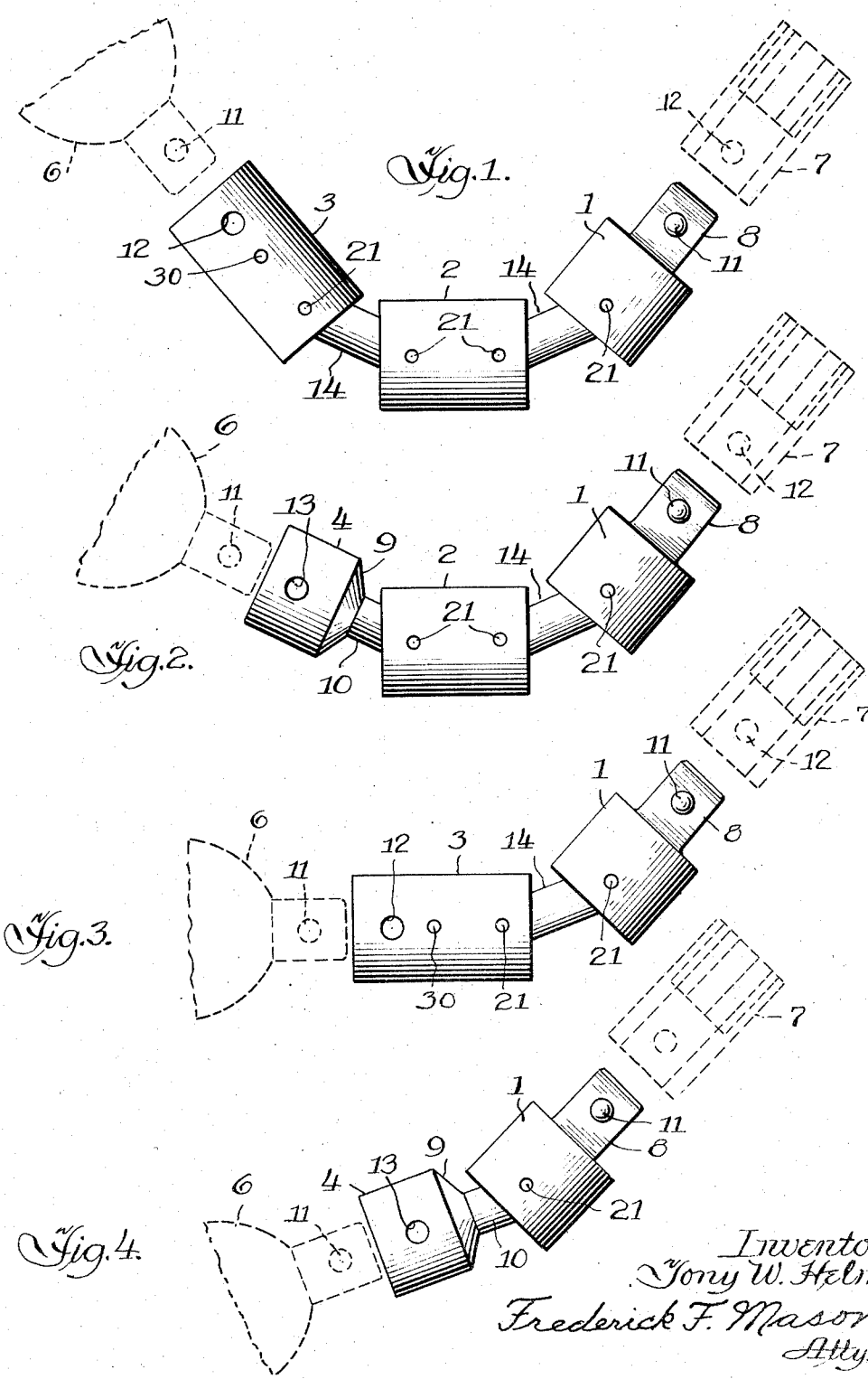
Inventor,
Tony W. Helm,
Frederick F. Mason
Atty.

July 21, 1959      T. W. HELM      2,895,314
UNIVERSAL JOINT
Filed July 25, 1958      2 Sheets-Sheet 2
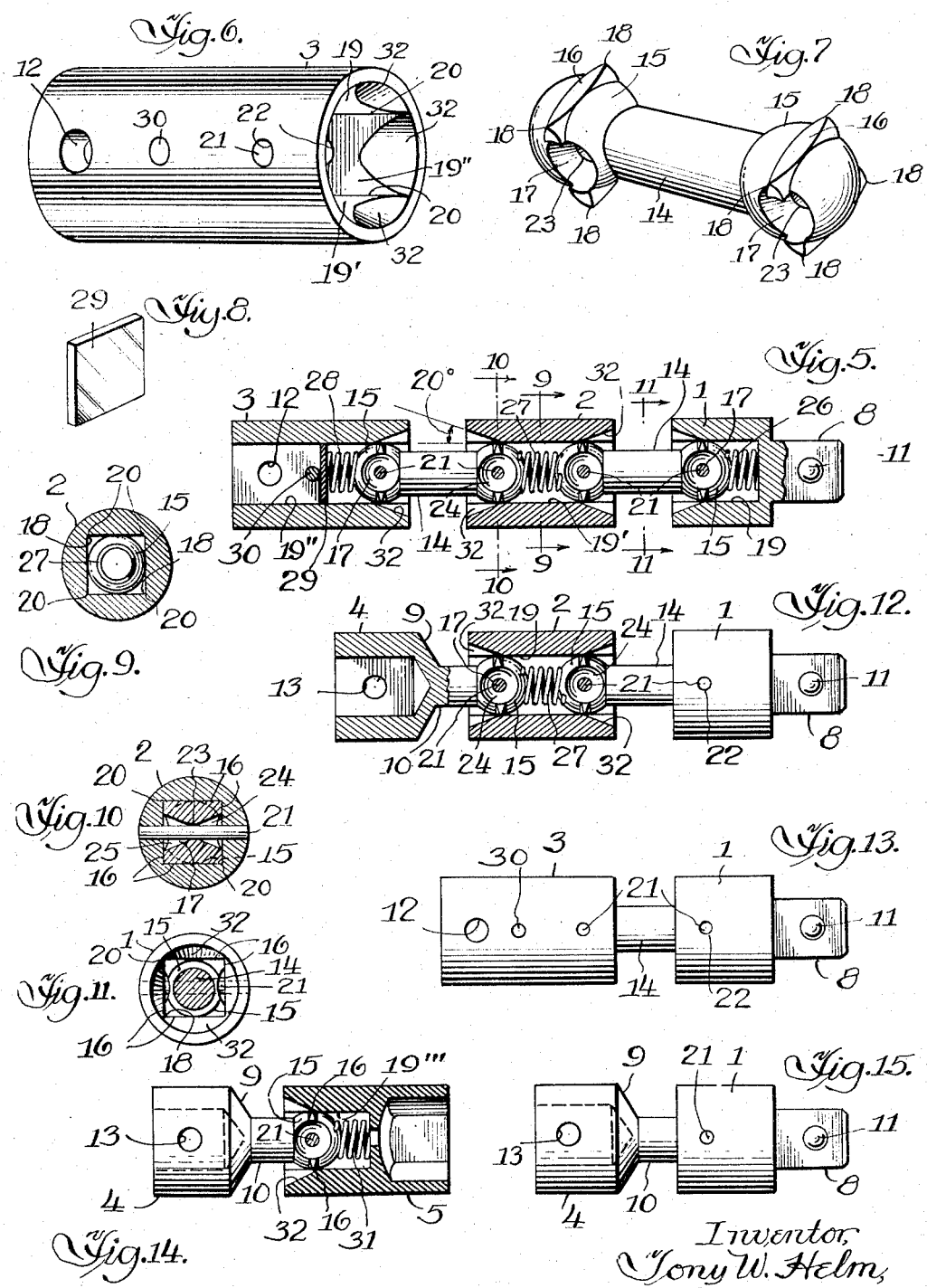
Inventor,
Tony W. Helm,
Frederick F. Mason,
Atty.

United States Patent Office 2,895,314
Patented July 21, 1959

2,895,314

UNIVERSAL JOINT

Tony W. Helm, Chicago, Ill.

Application July 25, 1958, Serial No. 751,021

1 Claim. (Cl. 64—7)

This invention relates to a universal joint, and more particularly to such joints that can be made in groups having a plurality of units for increasing or varying the angle between the axis of the driving element and the axis of the driven element.

The present invention is an improvement over that disclosed in the patent to Helm & Derieg No. 2,760,358, granted August 28, 1956.

In the use of mechanic's tools, it often occurs that a considerable angle exists between the axis of the driven element and the available position for the axis of the driving element. By the use of the present invention I have made it possible to transmit such driving force through angles greater and less than three hundred and sixty degrees. A plurality of groups, each having a different number of units, can be made, so that the desired group having the desired number of units can be selected for any particular job, or groups having a small number of units can be provided, and two or more of such groups connected together as may be required for a particular job. In the following description, in connection with the drawings herein, it will be seen that I have provided a device of universal applicability in transmitting rotational driving power from a driving element to a driven element, regardless of the angle that may exist between the axes of rotation thereof.

Among the objects of my invention are: to provide a novel and improved universal joint; to provide a universal joint having a plurality of units of novel construction, to accomplish the advantages referred to above; to provide a device of the character referred to having one, or a plurality, of intermediate links, an end adaptor, and an end drive member; to provide a universal joint device having three or more units connected together by stems having at one or both ends a novel universal joint connection with the adjacent end of the adjacent unit; to provide a universal joint having a novel driving connection of a ball with a socket member; to provide a universal joint having a novel pin connection between a ball and a socket member; and such further objects, advantages and capabilities, inherently possessed by my invention, as will later more fully appear.

My invention further resides in the combination, construction and arrangement of parts illustrated in the accompanying drawings, and while I have shown therein a preferred embodiment, I wish it understood that the same is susceptible of modification and change without departing from the spirit of my invention.

In the drawings:

Fig. 1 is a side elevation of a group of universal joint units, embodying my invention, in position for applying turning force to a driven element whose axis of rotation is positioned at a substantial angle from the axis of rotation of the driving element.

Fig. 2 is a view similar to Fig. 1, but showing an arrangement of parts for applying turning force through a somewhat smaller angle.

Fig. 3 is a view similar to Figs. 1 and 2, but showing an arrangement of parts for applying turning force through an angle of approximately 40 degrees.

Fig. 4 is a view similar to Figs. 1, 2 and 3, but showing an arrangement of parts for applying turning force through an angle of approximately 20 degrees.

Fig. 5 is a longitudinal section on a median plane, of the three universal joint units shown in solid lines in Fig. 1, but showing them positioned in a straight line instead of at an angle to each other.

Fig. 6 is an enlarged, perspective view of the female adaptor member, this being the unit shown at the left hand side of Fig. 5.

Fig. 7 is an enlarged, perspective view of the stem having a specially formed ball at each end.

Fig. 8 is an enlarged, perspective view of the spring abutment plate.

Fig. 9 is a transverse section on the line 9—9 of Fig. 5.

Fig. 10 is a transverse section on the line 10—10 of Fig. 5.

Fig. 11 is a transverse section on the line 11—11 of Fig. 5.

Fig. 12 is a longitudinal section, partly in elevation, on a median plane, of the three universal joint units shown in solid lines in Fig. 2, but showing them positioned in a straight line instead of at an angle to each other.

Fig. 13 is a side elevation of the two universal joint units shown in solid lines in Fig. 3, but showing them positioned in a straight line instead of at an angle to each other.

Fig. 14 is a longitudinal section, partly in elevation, on a median plane, of the flex socket member shown in jointed connection with the female drive end member.

Fig. 15 is a side elevation of the two universal joint units shown in solid lines in Fig. 4, but showing them positioned in a straight line instead of at an angle to each other.

As shown in the drawings, for illustrative purposes, my invention comprises in general, a specially formed universal joint for connecting together in any desired combination a male adaptor member 1, an intermediate link 2, and a female adaptor member 3, as shown in Figs. 1 and 5, or a male adaptor member 1, an intermediate link 2, and a female drive end member 4, as shown in Figs. 2 and 12, or a male adaptor member 1, and a female adaptor member 3 as shown in Figs. 3 and 13, or a male adaptor member 1 and a female drive end member 4, as shown in Figs. 4 and 15, or a flex socket member 5, and a female drive end member 4 as shown in Fig. 14, or any suitable combination of these or other suitable members or units, to provide a variety of angles as desired between the axis of the driving member 6 and the axis of the socket member 7 to be connected onto the driven member, as will be later more fully understood. The members or units 1—5 are preferably of a cylindrical external surface, except that the male adaptor member 1 has an extension 8 that is preferably of square cross section, and the female drive end member 4 has a conical portion 9 to reduce the diameter down to that of the short stem 10.

The male adaptor members 1, each have positioned in one of the flat side faces of the extension 8, a spring pressed ball 11, to serve as a resilient detent to be seated into a complemental hole or recess when the extension 8 of member 1 is inserted into the open end of another unit or group of units, as for example the ball 11 may be seated into hole 12 of the female adaptor member 3, or into the hole 13 of the female drive end member 4, or into similar holes in any other suitable units or parts, as desired, for driving connection therewith. As such resilient, detent balls and recesses are well known in the art, further detail description thereof is unnecessary.

As is seen in Figs. 5, 12 and 14, the respective units, such as the male adaptor member 1, the intermediate link 2, the female adaptor member 3, the female drive end member 4, the flex socket member 5, and any other units desired, may be connected together in such groups as may be preferred, by universal joints. For connecting intermediate units to adjacent units, connecting stems 14, each having at each end the male portion of the universal joint, will be used, while in connecting some other units together, as for example see Fig. 14, a short stem 10 having the male portion of the universal joint at one end and rigidly connected to the unit at the other end, will be used.

As the various universal joints are all of the same construction, only one of them need be described in detail. Referring to Fig. 7, the male portion of the universal joint, at each end of the stem 14, has integrally fixed thereto a ball 15 having at its middle exterior portion in planes at right angles to the axis of rotation of the stem 14, on each of four of its sides, a widened driving face 16, which faces, in the form shown, extend laterally of the ball, each face being at right angles to the next adjacent face, to form a square in cross section through the ball except that a hole 17 extends through the ball and through two of the widened faces on two opposite sides of the ball. Hole 17 removes the intermediate portion of the two widened faces on said two opposite sides of the ball, but leaves the end portions of these two apertured widened faces intact. All of the end portions of all four of these widened faces are tapered to a point 18 for a reason later explained.

The two complete widened faces, and those portions remaining after formation of the hole 17 in the other two faces, are slightly rounded, in a direction longitudinally of the axis of rotation of stem 14, a small amount just enough to prevent any binding of these widened faces against the adjacent inner flat faces 19, 19', 19'', or 19''', of the longitudinal central hole or opening of the unit in which the universal joint may be mounted, as for example 19 in the male adaptor member 1, 19' in the intermediate link 2, 19'' in the female adaptor member 3, and 19''' in the flex socket member 5.

The units 1—5, and any other similar units, are preferably cylindrical in external form, and have an inner longitudinal central opening that may, or may not, extend entirely therethrough, which opening, for the greater portion of its length, is preferably square in cross section, although other suitable noncircular cross sections could be used if desired. For purposes of illustration however, such openings will here be referred to as of square cross section. Such openings are of a width the same as the length of the widened faces 16 of the ball 15, and have corners 20 into which the tapered points 18 of the widened faces 16 fully extend when the axes of rotation of the units are in a straight line. When the units move from a straight line to an angular position, said points 18 will swing longitudinally in said corners in one direction or the other, depending on the direction of angular movement of the units, and which point 18 of the ball is being considered.

In order that this movement of the points 18 in the corners 20, and the movement of the ball 15 in the unit, will be understood, it is pointed out that a pin 21 passes through the hole 17 in the ball 15, the opposite end portions of this pin being firmly fixed in complemental holes 22 in the diametrically opposite sides of the unit wall. One of the important features of the present invention is the shape of the hole 17, and the coaction of the pin 21 in this hole. As will be seen in Fig. 10, the hole 17, at its midposition 23, is of the same diameter as the pin 21 except for just enough clearance to permit the ball 15 to have rotative movement with relation to the pin. On each side of said midposition 23, the hole 17 is conically flared outwardly in opposite directions at 24 and 25, see Fig. 10, to permit the ball to have universal joint movement at all angles with relation to the axis of rotation of the unit within which it is mounted. Pin 21, in ball 15, does not carry any load, but merely holds the ball in position in the unit casing, and because of the shape of the hole, and the shape of the ball, said universal joint movement is made possible.

In the central longitudinal opening in unit 1, see Fig. 5, a coiled compression spring 26 is positioned between the end of the ball 15 and the end wall of the opening in the unit. In the central longitudinal opening in unit 2, a coiled compression spring 27 is positioned between the two ends of the balls 15. In the central longitudinal opening in unit 3, a coiled compression spring 28 is positioned between the end of the ball 15, and the abutment plate 29 held against axial movement by pin 30 fixed in the unit walls. In the central longitudinal opening in unit 5, a coiled compression spring 31 is positioned between the end of the ball 15 and the end wall of the opening in the unit, as seen in Fig. 14. The purpose of these coiled compression springs is to hold the ball 15 against the pin 21 to prevent rattling should these parts become a little worn, and also hold the universal joints in angled position for easy application of the socket on the nut or other part to be driven.

As seen in Fig. 6, the inside of the ball end of the casing of the unit 3 is formed in the end of each of the flat sides of the longitudinal central opening in the unit, with an outwardly flaring curved cut-away portion 32 which, considered together, form a conically curved countersink in the end of the unit casing. Such conical countersink is formed in each of the open ends of the other units having a universal joint therein. The angle of such conical surface with relation to the longitudinal axis of its respective unit is preferably 20 degrees, as shown in unit 2 in Fig. 5, but such angle could be made greater or less as desired.

From the above it will be seen that I have provided an improved universal joint construction capable of use in a single or a plurality of joints, and applicable for use regardless of the degree of angle between the axis of rotation of the driving member and the axis of rotation of the driven member. These devices may be made in groups of any desired number of units connected together by the universal joints of the present invention, as for example two units connected by a single universal joint as shown in Figs. 4, 14 and 15; two units connected by two universal joints as shown in Figs. 3 and 13; three units connected by three universal joints as shown in Figs. 2 and 12; three units connected by four universal joints as shown in Figs. 1 and 5; or any other suitable arrangement and number of units desired.

In arrangements shown in Figs. 1–5, 12, 13 and 15, in the right hand unit, which is the male adaptor member 1, the extension 8 will be pushed into the socket member 7 and releasably held therein by interengagement of the spring pressed ball 11 and a complemental hole 12, this socket member having a suitably formed socket to receive the nut, bolt head, or other part to be turned in the driven member to be tightened or loosened. At the opposite end of the group of units, as seen in Figs. 1–4, a driving member 6, having a spring pressed detent ball, will be inserted into the socket of unit 3, or unit 4, the detent ball being releasably engaged in hole 12, or hole 13, for transmitting rotational power through the group of angularly positioned units to the driven member driven by socket member 7.

As stated, the longitudinal central opening in the various units, may be of square cross section, or of a suitable cross section of other than four flat faces, in which latter case the widened faces 16 of the ball 15 would together have a cross section, at right angles to the axis of rotation of ball 15, complemental to that of the longitudinal central opening in the unit.

Having described my invention, I claim:

A universal joint for transmitting rotational power from a driving member to a driven member through angularly poistioned units, comprising, a female member having a longitudinal central opening formed with flat side walls meeting in longitudinally extending angle corners, a male member having a stem with a ball fixed at one end thereof with the ball positioned in said longitudinal central opening, said ball having radially extending portions arranged in a series angularly positioned therearound, each of said radially extended portions having a driving face extending across the adjacent side wall of said longitudinal central opening and close thereto, each of said driving faces having at each end a tapered point seated in the adjacent longitudinally extending corner of said longitudinal opening, said ball having a diametrical hole therethrough, a pin extending through said hole in the ball and across said longitudinal central opening and fixed at its ends to the female member, said hole in the ball being at its longitudinal middle approximately the diameter of the pin and progressively increasing in diameter on both sides of said middle, said female member being formed at one end adjacent the ball with an outwardly flared countersink to increase the swing of the stem in all angular directions, and a compression spring in the longitudinal central opening of the female member, said spring bearing against the ball on the side opposite from that of the stem.

References Cited in the file of this patent

UNITED STATES PATENTS

| | | |
|---|---|---|
| 123,049 | Roper et al. | Jan. 23, 1872 |
| 636,758 | Casaday | Nov. 14, 1899 |
| 1,119,572 | Butler | Dec. 1, 1914 |
| 2,760,358 | Helm et al. | Aug. 28, 1956 |